US011260852B2

(12) United States Patent
Rahimi et al.

(10) Patent No.: US 11,260,852 B2
(45) Date of Patent: Mar. 1, 2022

(54) COLLISION BEHAVIOR RECOGNITION AND AVOIDANCE

(71) Applicant: GM GLOBAL TECHNOLOGY OPERATIONS LLC, Detroit, MI (US)

(72) Inventors: Amir M. Rahimi, Malibu, CA (US); Aashish N. Patel, Los Angeles, CA (US); Rajan Bhattacharyya, Sherman Oaks, CA (US); Srinivas Nedunuri, Santa Monica, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 226 days.

(21) Appl. No.: 16/365,078

(22) Filed: Mar. 26, 2019

(65) Prior Publication Data
US 2020/0307564 A1    Oct. 1, 2020

(51) Int. Cl.
*B60W 30/09* (2012.01)
*B60W 30/095* (2012.01)
*B60W 30/14* (2006.01)
*B60W 30/18* (2012.01)
*G06N 3/04* (2006.01)
*G06N 3/08* (2006.01)
(Continued)

(52) U.S. Cl.
CPC ........ *B60W 30/09* (2013.01); *B60W 30/0953* (2013.01); *B60W 30/0956* (2013.01); *B60W 30/143* (2013.01); *B60W 30/18163* (2013.01); *G06N 3/0454* (2013.01); *G06N 3/08* (2013.01); *G08G 1/166* (2013.01); *G08G 1/167* (2013.01)

(58) Field of Classification Search
CPC ............ B60W 30/09; B60W 30/0956; B60W 60/0015; B60W 50/0097
See application file for complete search history.

(56) References Cited

U.S. PATENT DOCUMENTS 10,994,741 B2 *  5/2021  Zhou ..................... B60W 40/09
2017/0166123 A1 *  6/2017  Bahgat ............. B60W 30/0956
(Continued)

OTHER PUBLICATIONS

Aly, "Real time Detection of Lane Markers in Urban Streets," arXiv preprint arXiv:1411.7113v1, Nov. 26, 2014, Intelligent Vehicles Symposium, 2008 IEEE, 6 pgs.
(Continued)

Primary Examiner — Kelly D Williams
(74) Attorney, Agent, or Firm — Cantor Colburn LLP

(57) ABSTRACT

Embodiments include methods, systems and computer readable storage medium for a method for collision avoidance by a vehicle is disclosed. The method includes installing a vehicle system into a vehicle, wherein the vehicle system provides collision avoidance guidance based on training data using movement information from one or more agents and behaviors associated with one or more individuals associated with the one or more agents or the vehicle. The method further includes detecting, by a processor, a collision course between the vehicle and the one or more mobile agents and/or one or more stationary agents. The method further includes calculating, by the processor, one or more decisions that avoid a collision in response to detecting a collision course. The method further includes selecting, by the processor, a decision from the one or more decisions and controlling, by the processor, operation of the vehicle based on the selected decision.

20 Claims, 6 Drawing Sheets

(51) Int. Cl.
*G08G 1/16* (2006.01)
*B60W 50/00* (2006.01)

(56) References Cited

U.S. PATENT DOCUMENTS

2019/0072965 A1* 3/2019 Zhang .................. G05D 1/0088
2019/0317513 A1* 10/2019 Zhang .................. G05D 1/0088
2020/0128372 A1* 4/2020 Zhang .................... H04W 4/12

OTHER PUBLICATIONS

Chen et al., "DeepDriving: Learning Affordance for Direct Perception in Autonomous Driving," Proceedings of the IEEE International Conference on Computer Vision. 2015, pp. 2722-2730.

Erhan et al., "Scalable Object Detection using Deep Neural Networks," Proceedings of the IEEE Conference on Computer Vision and Pattern Recognition, 2014, 8 pgs.

Felzenszwalb et al., "Object Detection with Discriminatively Trained Part-Based Models," IEEE Transactions on Pattern Analysis and Machine Intelligence, vol. 32, No. 9, Sep. 2010, pp. 1627-1645.

Hochreiter et al., "Long Short-Term Memory," Neural Computation, 9, © 1997 Massachusetts Institute of Technology, pp. 1735-1780 (226 total pgs.).

Sak et al., "Long Short-Term Memory Recurrent Neural Network Architectures for Large Scale Acoustic Modeling," Fifteenth Annual Conference of the International Speech Communication Association, Sep. 14-18, 2014, pp. 338-342.

Vinyals et al., "A Neural Conversational Model," arXiv preprint arXiv: 1506.05869, Jul. 22, 2015, Proceedings of the 31st International Conference on Machine Learning, W&CP, vol. 37, 8 pgs.

Wang et al., "Tracking Interacting Objects Optimally Using Integer Programming," European Conference on Computer Vision and Learning Group, Springer International Publishing, 2014, pp. 1-16.

* cited by examiner

COLLISION BEHAVIOR RECOGNITION AND AVOIDANCE

INTRODUCTION

The subject disclosure relates to vehicle collision detection, and more specifically to vehicle collision detection using vehicle movement predictions and interactions as related to mobile agent movement predictions and stationary agents.

Autonomous vehicles have the ability to operate and navigate without human input. Autonomous vehicles, as well as some non-autonomous vehicles, use sensors, such as cameras, radar, LIDAR, global positioning systems, and computer vision, to detect the vehicle's surroundings. Advanced computer control systems interpret the sensory input information to identify a vehicle's location, appropriate navigation paths, as well as obstacles and relevant signage. Some autonomous vehicles update map information in real time to remain aware of the autonomous vehicle's location even if conditions change or the vehicle enters an uncharted environment. Autonomous vehicles, as well as non-autonomous vehicles, increasingly communicate with remote computer systems and with one another using V2X communications—Vehicle-to-Everything, Vehicle-to-Vehicle (V2V), Vehicle-to-Infrastructure (V2I)).

As autonomous and semi-autonomous vehicles become more prevalent, having an accurate location of each vehicle on a road network and detecting obstacles that can collide with the vehicle is important. Accordingly, it is desirable to provide further improvements for collision avoidance while a vehicle is traversing the road network.

SUMMARY

In one exemplary embodiment, a method for collision avoidance by a vehicle is disclosed. The method includes installing a vehicle system into a vehicle, wherein the vehicle system provides collision avoidance guidance based on training data using movement information from one or more agents and behaviors associated with one or more individuals associated with the one or more agents or the vehicle. The method further includes detecting, by a processor, a collision course between the vehicle and the one or more mobile agents and/or one or more stationary agents. The method further includes calculating, by the processor, one or more decisions that avoid a collision in response to detecting a collision course, wherein each decision includes a vehicle trajectory. The method further includes selecting, by the processor, a decision from the one or more decisions. The method further includes controlling, by the processor, operation of the vehicle based on the selected decision.

In addition to one or more of the features described herein, one or more aspects of the described method recognize that the training data includes data based on one or more predictive models that are used to predict a future movement associated with the one or more agents. Another aspect of the method uses one or more Recurrent Neural Networks (RNN) are used to calculate the one or more decisions that avoid the collision. Another aspect of the method is that the one or more agents are mobile agents or stationary agents. Another aspect of the method is that the movement information from one or more agent includes speed, heading, and location information. Another aspect of the method is that a collision window is utilized to detect a collision course. Another aspect of the method is that controlling operation of the vehicle includes a change of speed and/or a lane change.

In another exemplary embodiment, a system for collision avoidance by a vehicle is disclosed herein. The system includes a vehicle having a memory, a processor coupled to the memory, a decision resolver, a trajectory planner and a controller. The processor associated with the vehicle is operable to utilize a vehicle system into a vehicle, wherein the vehicle system provides collision avoidance guidance based on training data using movement information from one or more agents and behaviors associated with one or more individuals associated with the one or more agents or the vehicle. The processor is further operable to detect a collision course between the vehicle and the one or more mobile agents and/or one or more stationary agents. The processor is further operable to calculate one or more decisions that avoid a collision in response to detecting a collision course, wherein each decision includes a vehicle trajectory. The processor is further operable to select a decision from the one or more decisions. The processor is further operable to control operation of the vehicle based on the selected decision.

In yet another exemplary embodiment a computer readable storage medium for performing a method for collision avoidance by a vehicle is disclosed herein. The computer readable storage medium includes installing a vehicle system into a vehicle, wherein the vehicle system provides collision avoidance guidance based on training data using movement information from one or more agents and behaviors associated with one or more individuals associated with the one or more agents or the vehicle. The computer readable storage medium further includes detecting a collision course between the vehicle and the one or more mobile agents and/or one or more stationary agents. The computer readable storage medium further includes calculating one or more decisions that avoid a collision in response to detecting a collision course, wherein each decision includes a vehicle trajectory. The computer readable storage medium further includes selecting a decision from the one or more decisions. The computer readable storage medium further includes controlling operation of the vehicle based on the selected decision.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
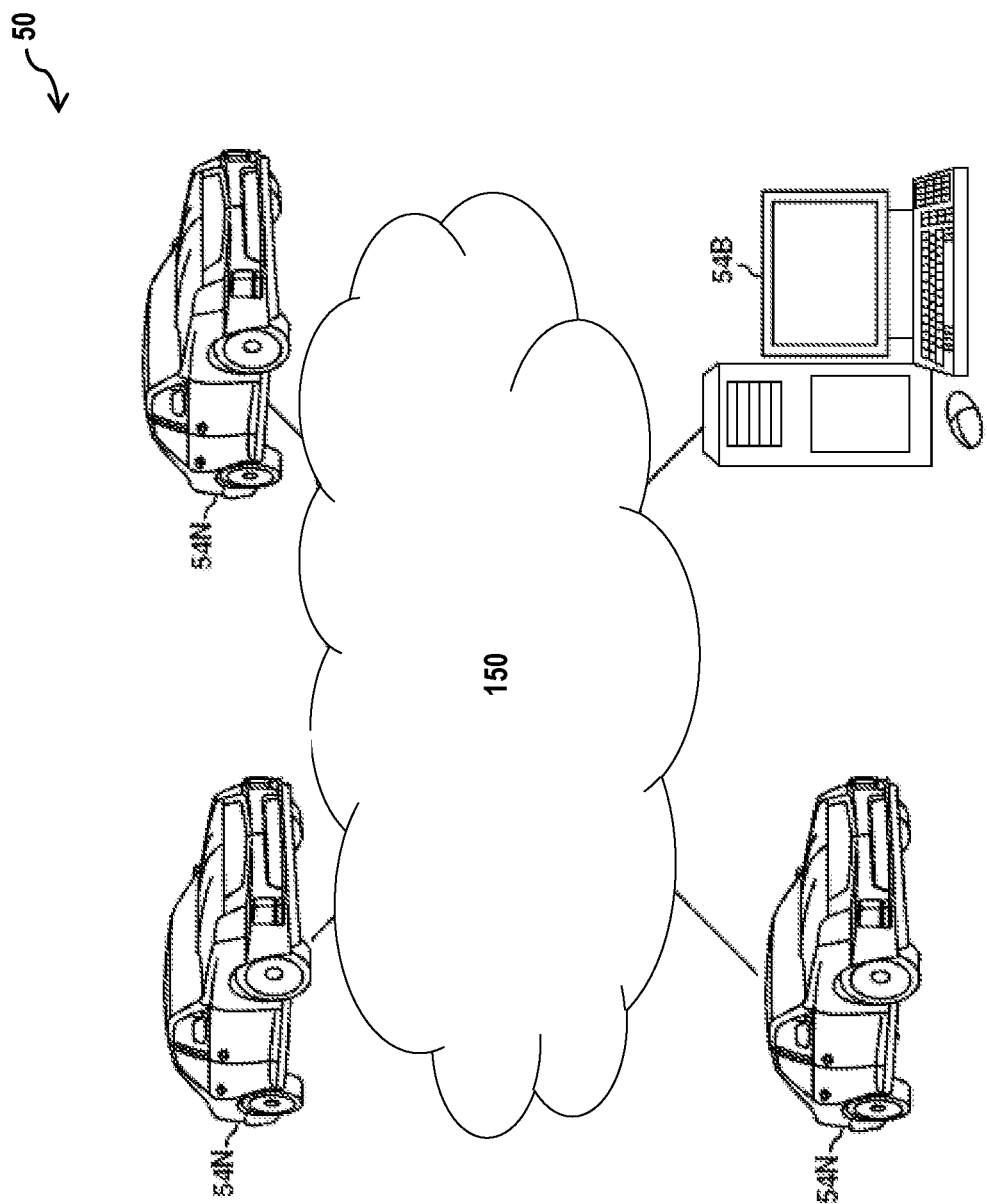
FIG. 1 is a computing environment according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 illustrates a computing environment 50 associated with a system for collision avoidance by a vehicle according to one or more embodiments. As shown, the computing environment 50 comprises one or more computing devices, for example, a server/cloud 54B, and/or a vehicle onboard computer system 54N incorporated into each of a plurality of autonomous or non-autonomous vehicles, which are connected via network 150. The one or more computing devices can communicate with one another using network 150.

Network 150 can be, for example, a cellular network, a local area network (LAN), a wide area network (WAN), such as the Internet and WIFI, a dedicated short-range communications network (for example, V2V communication (vehicle-to-vehicle), V2X communication (i.e., vehicle-to-everything), V2I communication (vehicle-to-infrastructure), and V2P communication (vehicle-to-pedestrian)), or any combination thereof, and may include wired, wireless, fiber optic, or any other connection. Network 150 can be any combination of connections and protocols that will support communication between server/cloud 54B, and/or the plurality of vehicle onboard computer systems 54N, respectively.

When a cloud is employed instead of a server, server/cloud 54B can serve as a remote computing resource. Server/cloud 54B can be implemented as a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 2:
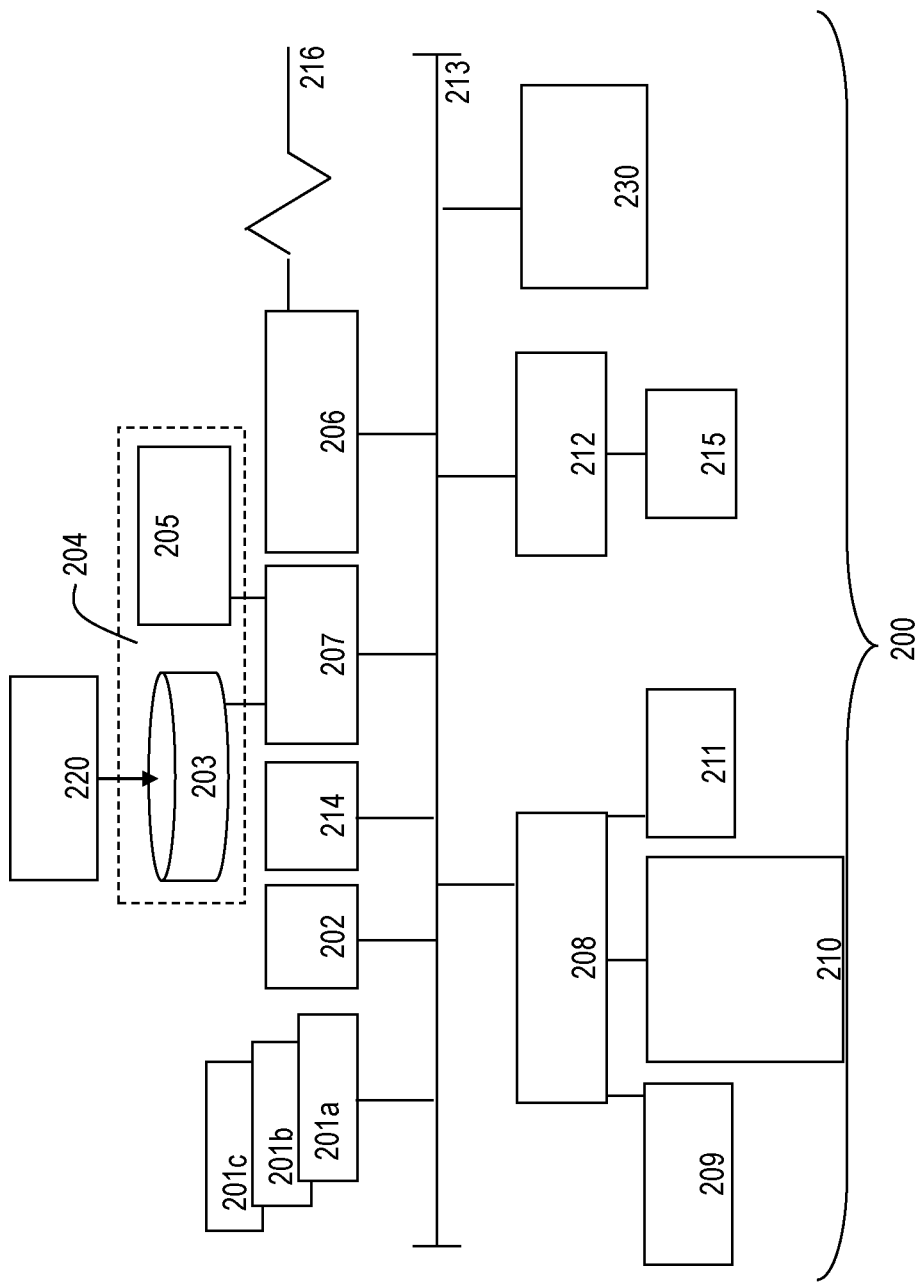
FIG. 2 is a block diagram illustrating one example of a processing system for practice of the teachings herein.

In accordance with an exemplary embodiment, FIG. 2 illustrates a processing system 200 for implementing the teachings herein. The processing system 200 can form at least a portion of the one or more computing devices, such as server/cloud 54B, and/or vehicle onboard computer system 54N. The processing system 200 may include one or more central processing units (processors) 201a, 201b, 201c, etc. (collectively or generically referred to as processor(s) 201). Processors 201 are coupled to system memory 214 and various other components via a system bus 213. Read only memory (ROM) 202 is coupled to the system bus 213 and may include a basic input/output system (BIOS), which controls certain basic functions of the processing system 200.

FIG. 2 further depicts an input/output (I/O) adapter 207 and a network adapter 206 coupled to the system bus 213. I/O adapter 207 may be a small computer system interface (SCSI) adapter that communicates with a hard disk 203 and/or another storage drive 205 or any other similar component. I/O adapter 207, hard disk 203, and another storage drive 205 are collectively referred to herein as mass storage 204. Operating system 220 for execution on the processing system 200 may be stored in mass storage 204. The network adapter 206 interconnects system bus 213 with an outside network 216, which can be network 150, enabling processing system 200 to communicate with other such systems. A screen (e.g., a display monitor) 215 can be connected to system bus 213 by display adaptor 212, which may include a graphics adapter to improve the performance of graphics intensive applications and a video controller. In one embodiment, network adapter 206, I/O adapter 207, and display adapter 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 213 via user interface adapter 208 and display adapter 212. A microphone 209, steering wheel/dashboard controls 210, and speaker 211 can all be interconnected to system bus 213 via user interface adapter 208, which may include, for example, a Super I/O chip integrating multiple device adapters into a single integrated circuit.

The processing system 200 may additionally include a graphics-processing unit 230. The graphics-processing unit 230 is a specialized electronic circuit designed to manipulate and alter memory to accelerate the creation of images in a frame buffer intended for output to a display. In general, graphics-processing unit 230 is very efficient at manipulating computer graphics and image processing and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including system memory 214 and mass storage 204, input means such as microphone 209 and steering wheel/dashboard controls 210, and output capability including speaker 211 and display monitor 215. In one embodiment, a portion of system memory 214 and mass storage 204 collectively store an operating system to coordinate the functions of the various components shown in FIG. 2.

Figure 3:
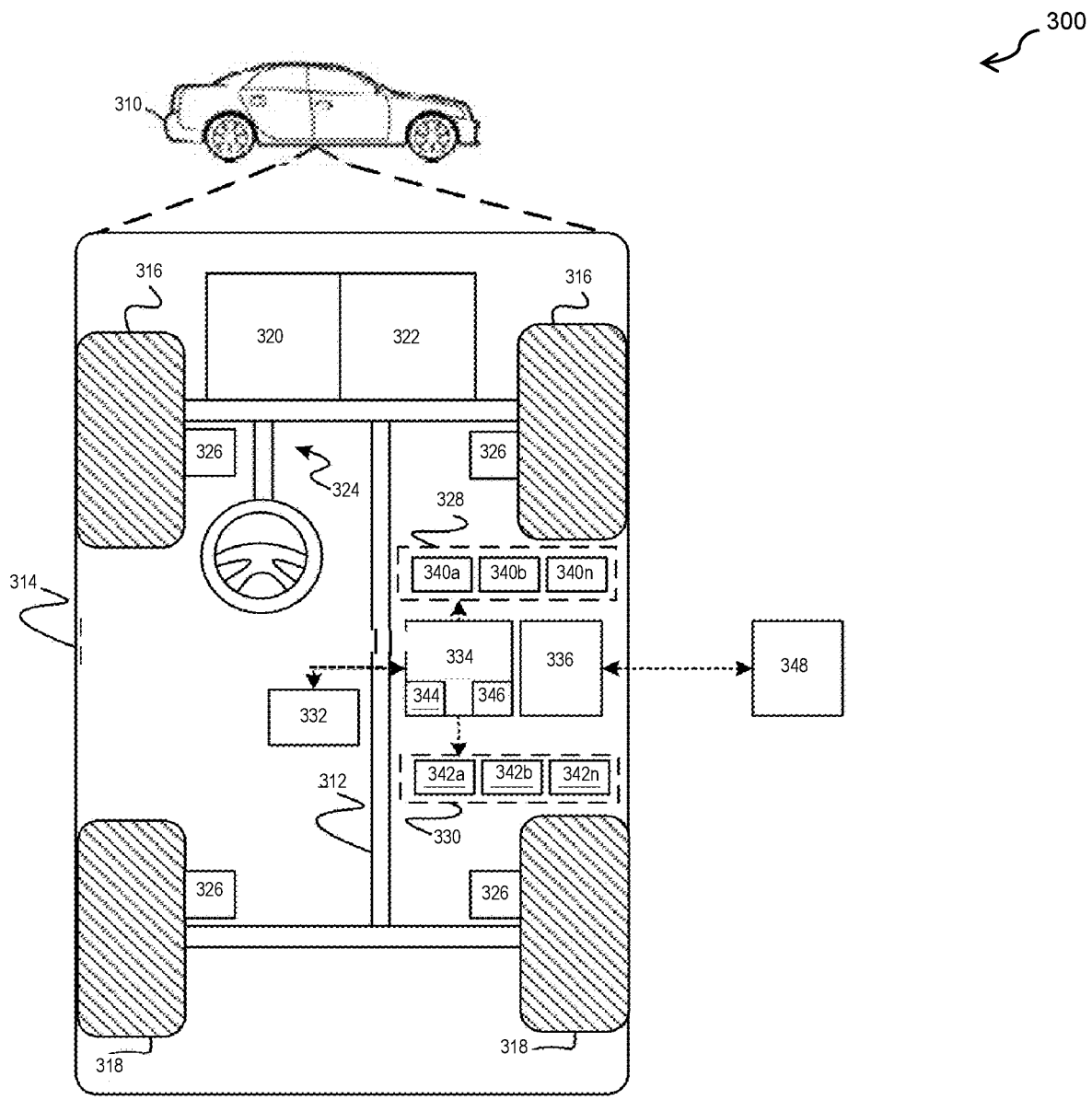
FIG. 3 depicts a schematic view of an exemplary vehicle system according to one or more embodiments.

FIG. 3 depicts components of a system 300 associated with autonomous or non-autonomous vehicles incorporating the vehicle onboard computer system 54N according to one or more embodiments. Vehicle 310 generally includes a chassis 312, a body 314, front wheels 316, and rear wheels 318. The body 314 can be arranged on the chassis 312 and can substantially enclose components of the vehicle 310. The body 314 and the chassis 312 may jointly form a frame. The wheels 316 and 318 are each rotationally coupled to the chassis 312 near a respective corner of the body 314.

A behavior planning and collision detection system can be incorporated into the vehicle 310. The vehicle 310 is depicted as a passenger car, but it should be appreciated that vehicle 310 can be another type of vehicle, for example, a motorcycle, a truck, a sportutility vehicle (SUV), a recreational vehicle (RV), a marine vessel, an aircraft, etc.

Vehicle 310 can operate according to various levels of the scales of vehicle automation, for example, Level 4 or Level 5. Operation at a Level 4 system indicates "high automation", referring to a driving mode-specific performance by an automated driving system of all aspects of the dynamic driving task, even if a human driver does not respond appropriately to a request to intervene. Operation at a Level 5 system indicates "full automation", referring to the full-time performance by an automated driving system of all aspects of the dynamic driving task under all roadway and environmental conditions that can be managed by a human driver.

Vehicle 310 can also include a propulsion system 320, a transmission system 322, a steering system 324, a brake system 326, a sensor system 328, an actuator system 330, at least one data storage device 332, at least one controller 334, and a communication system 336. The propulsion system 320 can be an internal combustion engine, an electric machine such as a traction motor, and/or a fuel cell propulsion system. The transmission system 322 can be configured to transmit power from the propulsion system 320 to the vehicle wheels 316 and 318 according to selectable speed ratios. The transmission system 322 may include a step-ratio automatic transmission, a continuously-variable transmission, or another appropriate transmission. The brake system 326 can be configured to provide braking torque to the vehicle wheels 316 and 318. The brake system 326 can utilize friction brakes, brake by wire, a regenerative braking system such as an electric machine, and/or other appropriate braking systems. The steering system 324 influences a position of the of the vehicle wheels 316 and 318.

The sensor system 328 can include one or more sensing devices 340a-340n that sense observable conditions of the exterior environment and/or the interior environment of the vehicle 310. The sensing devices 340a-340n can include, but are not limited to, speed, radars, LIDARs, global positioning systems, optical cameras, thermal cameras, ultrasonic sensors, inertial measurement units, and/or other sensors. The actuator system 330 includes one or more actuator devices 342a-342n that control one or more vehicle features such as, but not limited to, the propulsion system 320, the transmission system 322, the steering system 324, and the brake system 326. In various embodiments, the vehicle features can further include interior and/or exterior vehicle features such as, but are not limited to, doors, a trunk, and cabin features such as air, music, lighting, etc. (not numbered).

The sensor system 328 can be used to obtain a variety of vehicle readings and/or other information. The sensing devices 340a-340n can generate readings representing a position, velocity and/or acceleration of the vehicle 310. The sensing devices 340a-340n can also generate readings representing lateral acceleration, yaw rate, etc. The sensing devices 340a-340n can utilize a variety of different sensors and sensing techniques, including those that use rotational wheel speed, ground speed, accelerator pedal position, gear position, shift lever position, accelerometers, engine speed, engine output, and throttle valve position and inertial measurement unit (IMU) output, etc. The sensing devices 340a-340n can be used to determine vehicle speed relative to the ground by directing radar, laser and/or other signals towards known stationary objects and analyzing the reflected signals, or by employing feedback from a navigational unit that has GPS and/or telematics capabilities, via a telematics module, that can be used to monitor the location, movement, status and behavior of the vehicle.

The communication system 336 can be configured to wirelessly communicate information to and from other entities 348, such as but not limited to, other vehicles ("V2V" communication,) infrastructure ("V2I" communication), remote systems, and/or personal devices. The communication system 336 can be a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 332 can store data for use in automatically controlling the autonomous vehicle 310. The data storage device 332 can also store defined maps of the navigable environment. The defined maps can be obtained from a remote system. For example, the defined maps may be assembled by the remote system and communicated to the autonomous vehicle 310 (wirelessly and/or in a wired manner) and stored in the data storage device 332. Route information may also be stored within data storage device 332, (i.e., a set of road segments (associated geographically with one or more of the defined maps) that together define a route that a user may take to travel from a start location (e.g., the user's current location) to a target location). The data storage device 332 may be part of the controller 334, separate from the controller 334, or part of the controller 334 and part of a separate system.

The controller 334 can include at least one processor 344 and a computer readable storage device or media 346. The processor 344 can be any custom made or commercially available processor, a central processing unit (CPU), a graphics processing unit (GPU), an auxiliary processor among several processors associated with the controller 334, a semiconductor based microprocessor (in the form of a microchip or chip set), a macroprocessor, any combination thereof, or generally any device for executing instructions.

The instructions may include one or more separate programs, each of which comprises an ordered listing of executable instructions for implementing logical functions. The instructions, when executed by the processor 344, receive and process signals from the sensor system 328, perform logic, calculations, methods and/or algorithms for automatically controlling the components of the autonomous vehicle 310, and generate control signals to the actuator system 330 to automatically control the components of the autonomous vehicle 310 based on the logic, calculations, methods, and/or algorithms.

Vehicle 310 can also include a safety control module (not shown), an infotainment/entertainment control module (not shown), a telematics module (not shown), a GPS module (not shown) (GLONASS can be used as well), etc. The safety control module can provide various crash or collision sensing, avoidance and/or mitigation type features. For example, the safety control module provides and/or performs collision warnings, lane departure warnings, autonomous or semi-autonomous braking, autonomous or semi-autonomous steering, airbag deployment, active crumple zones, seat belt pre-tensioners or load limiters, and automatic notification to emergency responders in the event of a crash, etc.

The infotainment/entertainment control module can provide a combination of information and entertainment to occupants of the vehicle 310. The information and entertainment can be related to, for example, music, webpages, movies, television programs, video games and/or other information.

The telematics module can utilize wireless voice and/or data communication over a wireless carrier system (not shown) and via wireless networking (not shown) to enable the vehicle 310 to offer a number of different services including those related to navigation, telephony, emergency assistance, diagnostics, infotainment, etc. The telematics module can also utilize cellular communication according to GSM, W-CDMA, or CDMA standards and wireless communication according to one or more protocols implemented per 3G or 4G standards, or other wireless protocols, such as any of the IEEE 802.11 protocols, WiMAX, or Bluetooth. When used for packet-switched data communication such as TCP/IP, the telematics module can be configured with a static IP address or can be set up to automatically receive a dynamically assigned IP address from another device on the network, such as from a router or from a network address server (e.g., a DHCP server).

The GPS module can receive radio signals from a plurality of GPS satellites (not shown). From these received radio signals, the GPS module can determine a vehicle position that can be used for providing navigation and other position-related services. Navigation information can be presented on a display within the vehicle 310 (e.g., display 215) or can be presented verbally such as is done when supplying turn-by-turn navigation. Navigation services can be provided using a dedicated in-vehicle navigation module (which can be part of the GPS module), or some or all navigation services can be done via the telematics module. As such, the position information for the vehicle 310 can be sent to a remote location for purposes of providing the vehicle with navigation maps, map annotations (points of interest, restaurants, etc.), route calculations, and the like.

Figure 4:
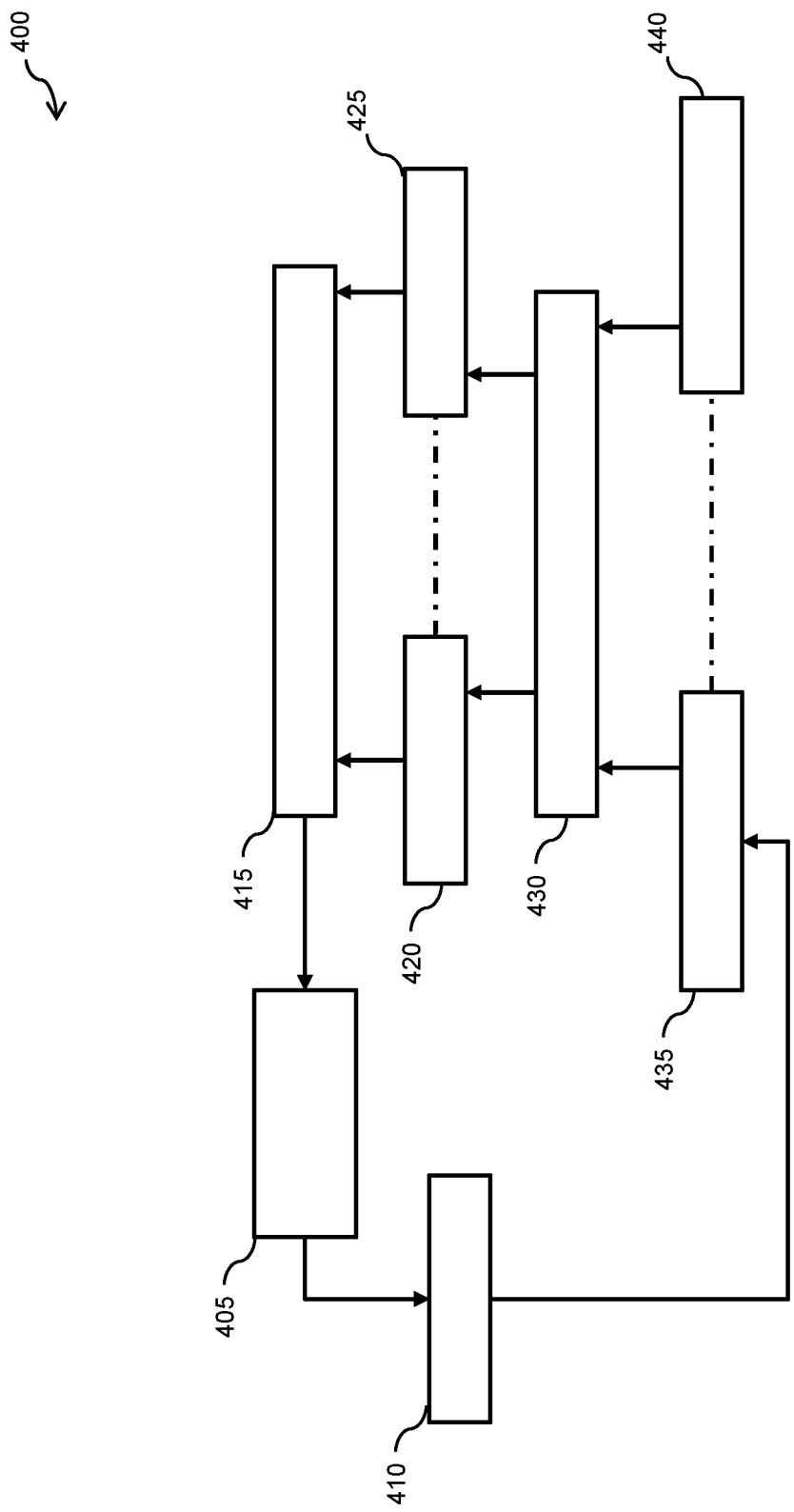
FIG. 4 is a block diagram of vehicle components according to one or more embodiments.

FIG. 4 depicts a behavior planning and collision detection system 400 associated with each of a plurality of autonomous or non-autonomous vehicles incorporating the vehicle onboard computer system 54N. System 400 can include a plurality of components (e.g., a controller 410, which can be controller 334, a hypothesis resolver 430, a decision resolver 415 and a trajectory planner 405.)

The behavior planning and collision detection system 400 can be initially trained to make path-planning decisions in light of a determined collision with an agent (e.g., a car, a truck, a motorcycle, a bike, a pedestrian, an animal, or any other mobile or stationary object) using generated training data provided by one or more simulators. The training data can include input based on human drivers operating a vehicle while traversing a section of a road network, and actions taken in response to driver interactions with other mobile or stationary objects, road signs, traffic signals, lane geometries, work zones, traffic, etc., (i.e., behavior). The training data can be based on a variety of factors, (e.g., a driving mode for the vehicle (conservative, aggressive, etc.)). When the behavior planning and collision detection system 400 has obtained an amount of training data above a predetermined threshold, the behavior planning and collision detection system 400 can be incorporated into vehicle 310. The behavior planning and collision detection system 400 incorporated into vehicle 310 can be utilized to make vehicle operation decisions based on a detected collision course with an agent while the vehicle 310 is operating in an autonomous or semi-autonomous manner.

The behavior planning and collision detection system 400 using training data or live data can utilize a plurality of movement behavioral models (i.e., predictive models (e.g., Kinematic, Tree Regression, etc.)) to develop multiple hypotheses (e.g., 435 and 440) in which each hypothesis can be a path prediction for an agent within a predetermined distance of the vehicle 310. Each path prediction includes a speed, heading, and location predictions as well as a computed trajectory for each agent.

Each hypothesis can be used to make path predictions (future) for the agent for a predetermined set of timestamps (e.g., each half second of a seven-second period). The time period covering the predicted future path of the agent can be used to determine whether a collision between the vehicle 310 and the agent could occur. The time period can be designated as a collision window. The collision window can begin at a timestamp when a potential collision could occur through a timestamp associated with a calculated collision instance.

If a collision course between the vehicle 310 and the agent is detected based on relative information, (i.e., respective relative speeds, relative headings and relative distances), a collision flag can be triggered and each hypothesis can estimate a time to collision between the vehicle 310 and the agent using the relative information. The predictions can be determined for a duration of the collision window.

Each hypothesis can be input into the hypothesis resolver 430. Each hypothesis can be a spatial trajectory of the agent moving from one location to another location on a map. The hypothesis resolver 430 can select and output a best hypothesis (based on performance) from the plurality of hypotheses (e.g., hypothesis 435 and hypothesis 440) input into the hypothesis resolver 430. The best hypothesis being a best-predicted path (future) for the agent over the predetermined time period. The hypothesis resolver 430 can also average hypotheses and output a predicted path (future) for the agent over the predetermined time period based on the average.

The output of the hypothesis resolver 430, (i.e., a best predicted future path or average predicted future path (predicted future path)) is input into a decision, (e.g., decision 1 (420) and decision M (425)). The hypothesis resolver 430 can output multiple predicted future paths for an agent. The hypothesis resolver 430 can also output multiple predicted future paths for any agent determined to be located within a predetermined range of the vehicle 310.

Each decision takes into consideration the best hypothesis for any agent located within the predetermined range of the vehicle 310. Each decision can analyze each hypothesis input to determine if a collision is likely within the collision window based on the predicted future path of the agent(s).

In response to a likely collision with an agent, a decision can utilize a Recurrent Neural Network (RNN) to calculate and output a trajectory that can be used to avoid the collision between an associated agent and the vehicle 310. Each RNN can model a behavior of each agent at a given timestamp within the collision window when the agent is on a collision course with the vehicle 310. Each modeled behavior can be categorized according to agent mobility in relation to the vehicle 310, (i.e., a mobile-to-mobile behavior when interacting with a mobile agent, and a mobile-to-stationary behavior when interacting with a stationary agent). The modeled behaviors, as well as a driving mode associated with the vehicle 310 can be input into a classifier (DNN) to make the trajectory prediction. The DNN can output the decision. An output trajectory output by a decision can be based on, for example, a change of speed for the vehicle 310, a lane change (i.e., a change in X/Y on the map) by the vehicle 310, or a combination thereof. Other decisions, (e.g., decision M (425)), may not utilize an RNN to calculate a vehicle trajectory based on another approach/model, (e.g., calculating an output trajectory with consideration of agents, etc.)

When the decision involves a change of speed, the decision can use the relative information associated with the vehicle 310 and the relative information associated with the mobile agent to generate an output for a trajectory that can cause the vehicle 310 to increase speed thereby creating additional space between the vehicle 310 and the mobile agent. An example is a case in which the vehicle 310 may be hit from behind or sideswiped by the mobile agent. In another instance of the decision involving a change of speed, the decision can use the relative information associated with the vehicle 310 and the relative information associated with the mobile agent to generate an output for a trajectory that can cause the vehicle 310 to decrease speed thereby creating additional space between the vehicle 310 and the mobile agent. In another instance of the decision involving a change of speed, the decision can use the relative information associated with the vehicle 310 and the relative information associated with an object or group of objects (e.g., a construction zone) to generate an output for a trajectory that can cause the vehicle 310 to decrease speed to safely negotiate around the object(s) or through the objects.

In addition to changes of speed and/or lane changes to address impending collision, each decision can be influenced by an assigned driving mode for vehicle 310, which is input into the DNN. For example, an assigned driving mode can be aggressive, moderate, conservative, scenic, enthusiast, or the like. The assigned driving mode can influence a decision, which may lead to a different output trajectory the driving mode not been considered (e.g. when approaching a slower vehicle/agent, the decision can be changing lanes when in an aggressive or to slow down in order to drive behind the slower vehicle/agent when in a conservative mode.)

When the decision involves a change of lane, the decision can use the relative information associated with the vehicle 310 and the relative information associated with the mobile agent to generate an output for a trajectory that can cause the vehicle 310 to avoid a collision by changing one or more lanes. In another instance of the decision involving a change of lane, the decision can use the relative information associated with the vehicle 310 and the relative information associated with an object or group of objects (e.g., a construction zone) to generate an output for a trajectory that can cause the vehicle 310 to change one or more lanes to safely negotiate around the object(s) or through the objects. Each decision can provide a valid/realistic (human) output trajectory even when an average output trajectory would be invalid (e.g., selecting a left fork of a road or right fork of the road when an average indicates selecting a path between the left and right fork.)

Each decision can be input into the decision resolver 415. The decision resolver 415 can select a best decision, (i.e., a decision that most closely mimics human behavior in light of a given set of events). The decision resolver 415 can input the selected decision into the trajectory planner 405. The trajectory planner 405 can generate a path/trajectory for the vehicle 310 to traverse using the output trajectory associated with the provided decision. The trajectory planner 405 can input the path/trajectory into the controller 410. The controller 410 can use the received path/trajectory to make vehicle operation decisions that avoid the collision.

Figure 5:
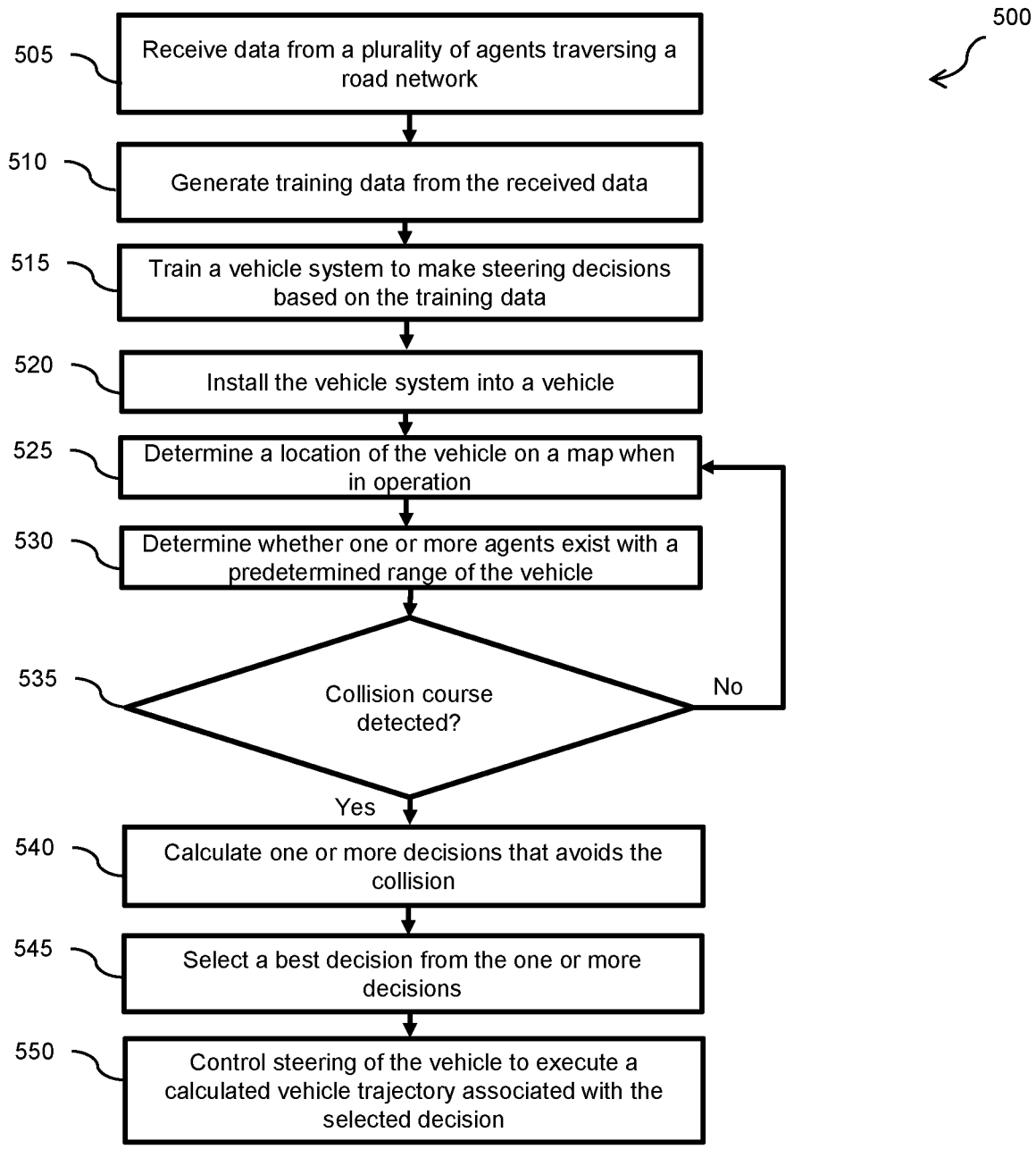
FIG. 5 depicts a flow diagram of a method for collision avoidance by a vehicle according to one or more embodiments.

FIG. 5 depicts a flow diagram of a method 500 for implementing a method for collision avoidance by a vehicle according to one or more embodiments. At block 505, a system, (e.g., behavior planning and collision detection system 400), can receive data from or about each of a plurality of agents. The received data can include speed, heading, and location information. At block 510, the system can generate training data from the received data. At block 515, a vehicle system or portion thereof can be trained using the generated training data. Training can be based on simulations of agents (mobile and stationary) interacting with each other on or along a road network. The simulations can be based on random permutations of agents, vehicles and road types.

At block 520, the trained vehicle system can be installed in a vehicle, (e.g., the vehicle onboard computer system 54N). At block 525, while the vehicle is in operation, (i.e., traversing the road network), the vehicle onboard computer system 54N can determine a location of the vehicle 310 on a map including a road network. At block 530, the vehicle onboard computer system 54N can determine whether one or more agents (mobile or stationary) exist within a predetermined range of the vehicle.

At block 535, the vehicle onboard computer system 54N can utilize the trained vehicle system to determine whether a collision course is detected between the vehicle and one or more mobile agents and/or one or more stationary agents along the road network. If a collision course is not detected, the method returns to block 525.

If a collision course is detected, the method proceeds to block 540 where the system can calculate one or more decisions that avoid the collision. Each decision can output a vehicle trajectory. The system can utilize one or more Recurrent Neural Networks (RNN) to calculate each decision. A driving mode can also be used in the calculation of the vehicle trajectory. At block 545, the vehicle onboard computer system 54N can select a best decision from the one or more calculated decisions. At block 550, the vehicle onboard computer system 54N can use a calculated trajectory associated with the best decision to control operation of the vehicle to execute the calculated trajectory.

Figure 6:
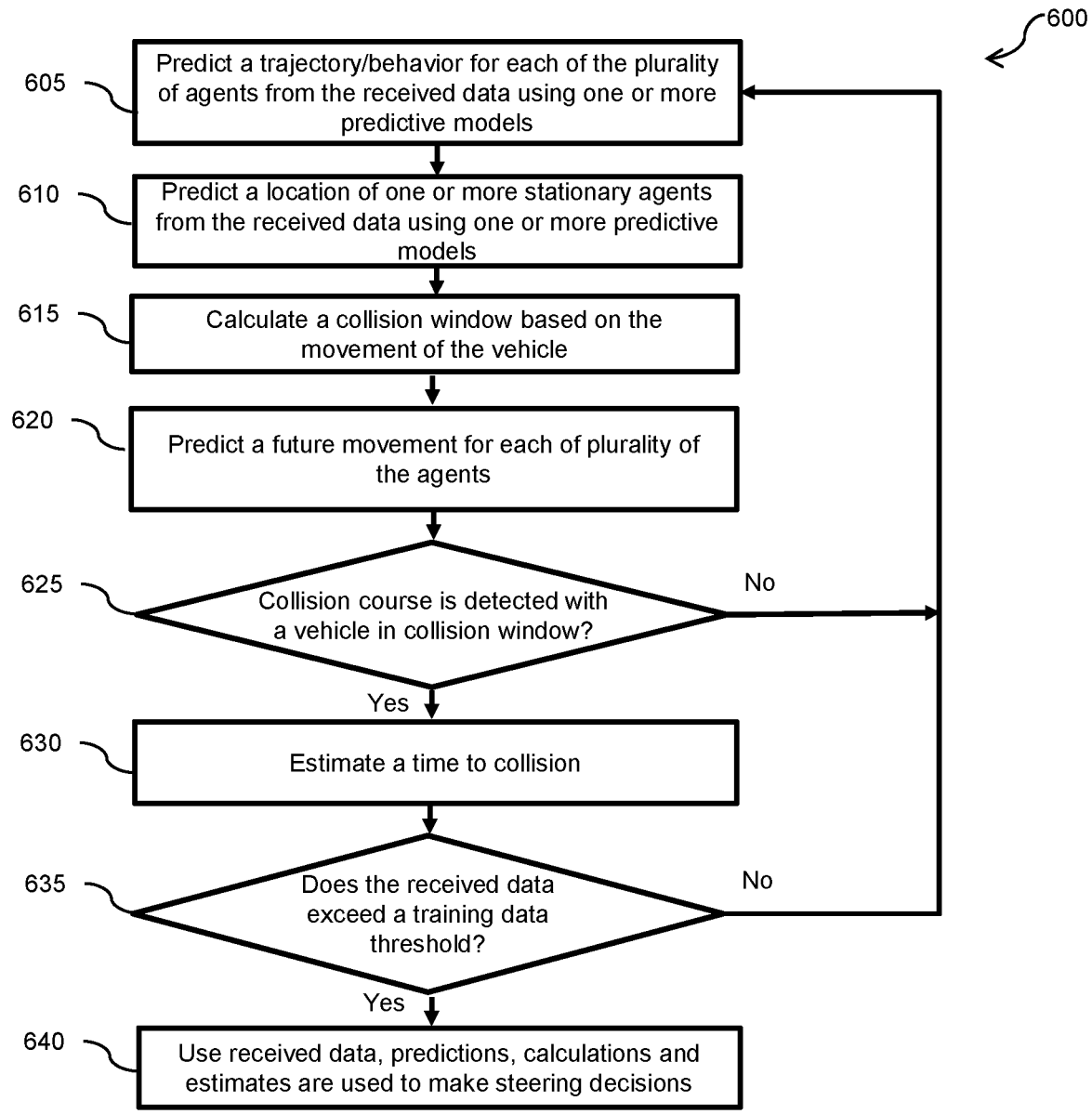
FIG. 6 depicts a flow diagram of a method for training a vehicle system of a vehicle for collision avoidance based on data received from each of a plurality of agents according to one or more embodiments.

FIG. 6 depicts a flow diagram of a method 600 for implementing a method for training a vehicle system of a vehicle 310 for collision avoidance based on data received from or about each of a plurality of agents according to one or more embodiments. At block 605, a system, (e.g., behavior planning and collision detection system 400), can predict a trajectory/behavior for each of the plurality of mobile agents using one or more predictive models and simulations. At block 610, the system can predict a location for one or more stationary agents using one or more predictive models. At block 615, the system can calculate a collision window for a vehicle.

At block 620, the system can predict a future movement/trajectory for each of the plurality of agents using one or more predictive models and simulations. At block 625, the system can determine whether a collision course is detected between the vehicle 310 and one or more mobile agents and/or one or more stationary agents. If a collision course is not detected, the method returns to block 605.

If a collision course is detected, the method proceeds to block 630, where the system estimates a time to an occurrence of the collision. At block 635, the system can determine whether the received data exceeds a training data threshold. The training data threshold can be a predetermined amount of data. If the received data does not exceed the training data threshold, the method returns to block 605. If the received data does exceed the training data threshold, the method proceeds to block 640 where the received data, predictions, calculations and estimates of the method are used to make vehicle operation decisions.

Accordingly, the embodiments disclosed herein describe a system that can model collision avoidance behavior and design an RNN structure that can utilize a sequence of "relative features" prediction (e.g., relative speed and relative heading) between agents that are on a collision course with a vehicle and modify the behavior of the vehicle (e.g., speed and/or heading) to avoid the collision. The RNN structure can be a sequence-to-sequence mapping used to avoid a collision. The RNN structure can be trained for operation using training data generated which includes random permutations of actions of the vehicle 310 and agents. Accordingly, the training data allows the RNN structure to operate based on an actual movement of the vehicle and agents while traversing a road network, as well as human decisions for a given interaction instead of employing rule-based models which are often less flexible and less responsive to actual driving situations.

Technical effects and benefits of the disclosed embodiments include, but are not limited to using behavioral patterns of human operation of vehicles gleaned from training data to avoid collisions between a vehicle and an agent (i.e., moving agents such as cars and pedestrians and stationary agents such as stop signs). Accordingly, autonomous and non-autonomous vehicles employing the disclosed embodiments operate with increased safety because a collision avoidance behavior can be implemented by a system based on simulated data used to train the system. Once the system is trained, real-world applications such as autonomous driving can be influenced to safely address dangerous conditions, such as collisions.

The present disclosure may be a system, a method, and/or a computer readable storage medium. The computer readable storage medium may include computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions may also be loaded onto a computer, other programmable data processing apparatus, or other device to cause a series of operational steps to be performed on the computer, other programmable apparatus or other devices to produce a computer implemented process, such that the instructions which execute on the computer, other programmable apparatus, or other device implement the functions/acts specified in the flowchart and/or block diagram block or blocks.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for collision avoidance by an automated vehicle, the method comprising:
   installing a vehicle system into the automated vehicle, wherein the vehicle system provides collision avoidance guidance based on 1) training data provided by one or more simulators including simulations of mobile and/or stationary objects interacting with each other and predicted future movement/trajectory of the mobile and/or stationary objects, and 2) training data based on behaviors of drivers operating a training vehicle comprising actions taken in response to the drivers' operation of the training vehicle in response to the one or more mobile and/or stationary objects and driving modes for the training vehicle;
   developing, by a processor and based upon the training data, multiple hypotheses using a plurality of predictive models, each hypothesis comprising multiple path predictions for one or more agents for a predetermined set of time stamps of a predetermined time period and categorized in accordance with the respective agent's mobility relative to the automated vehicle;
   selecting, by the processor, at least one of the multiple hypotheses as best predicted future paths for the one or more agents over the predetermined time period;
   detecting, by the processor, a collision course between the automated vehicle and the one or more agents by the vehicle system based on the selected at least one of the multiple hypotheses;
   calculating, by the processor, one or more decisions that avoid a collision in response to detecting the collision course, wherein each decision includes a trajectory for the automated vehicle based at least in part upon an assigned driving mode for the automated vehicle;
   selecting, by the processor, a decision from the one or more decisions; and
   controlling, by the processor, operation of the automated vehicle based on the selected decision.

2. The method of claim 1, wherein one or more Recurrent Neural Networks (RNN) are used to calculate the one or more decisions that avoid the collision.

3. The method of claim 1, wherein the one or more agents are mobile agents or stationary agents.

4. The method of claim 1, wherein the movement information from the one or more mobile and/or stationary objects includes speed, heading, and location information.

5. The method of claim 1, wherein a collision window is utilized to detect a collision course.

6. The method of claim 1, wherein controlling operation of the automated vehicle includes a change of speed and/or a lane change.

7. The method of claim 1, wherein the driving modes for the training vehicle comprise aggressive modes, moderate modes, conservative modes, scenic modes, and enthusiastic modes.

8. A system for collision avoidance by an automated vehicle, the system comprising:
   the automated vehicle comprises:
   a memory and a processor coupled to the memory; and
   a decision resolver;
   a trajectory planner; and
   a controller;
   wherein the processor is operable to:
   utilize a vehicle system in the automated vehicle, wherein the vehicle system provides collision avoidance guidance based on 1) training data provided by one or more simulators including simulations of mobile and/or stationary objects interacting with each other and predicted future movement/trajectory of the mobile and/or stationary objects, and 2) training data based on behaviors of drivers operating a training vehicle comprising actions taken in response to the drivers' operation of the training vehicle in response to the one or more mobile and/or stationary objects and driving modes for the training vehicle;

develop, based upon the training data, multiple hypotheses using a plurality of predictive models, each hypothesis comprising multiple path predictions for one or more agents for a predetermined set of time stamps of a predetermined time period and categorized in accordance with the respective agent's mobility relative to the automated vehicle;

select at least one of the multiple hypotheses as best predicted future paths for the one or more agents over the predetermined time period;

detect a collision course between the automated vehicle and the one or more agents by the vehicle system based on the selected at least one of the multiple hypotheses;

calculate one or more decisions that avoid a collision in response to detecting the collision course, wherein each decision includes a trajectory for the automated vehicle based at least in part upon an assigned driving mode for the automated vehicle;

select a decision from the one or more decisions; and control operation of the automated vehicle based on the selected decision.

9. The system of claim 8, wherein one or more Recurrent Neural Networks (RNN) are used to calculate the one or more decisions that avoid the collision.

10. The system of claim 8, wherein the one or more agents are mobile agents or stationary agents.

11. The system of claim 8, wherein the movement information from the one or more mobile and/or stationary objects includes speed, heading, and location information.

12. The system of claim 8, wherein a collision window is utilized to detect a collision course.

13. The system of claim 8, wherein controlling operation of the automated vehicle includes a change of speed and/or a lane change.

14. The system of claim 8, wherein the driving modes for the training vehicle comprise aggressive modes, moderate modes, conservative modes, scenic modes, and enthusiastic modes.

15. A non-transitory computer readable medium having program instructions embodied therewith, the program instructions readable by a processor to cause the processor to perform a method for collision avoidance by an automated vehicle, the method comprising:

installing a vehicle system into the automated vehicle, wherein the vehicle system provides collision avoidance guidance based on 1) training data provided by one or more simulators including simulations of mobile and/or stationary objects interacting with each other and predicted future movement/trajectory of the mobile and/or stationary objects, and 2) training data based on behaviors of drivers operating a training vehicle comprising actions taken in response to the drivers' operation of the training vehicle in response to the one or more mobile and/or stationary objects and driving modes for the training vehicle;

developing, based upon the training data, multiple hypotheses using a plurality of predictive models, each hypothesis comprising multiple path predictions for one or more agents for a predetermined set of time stamps of a predetermined time period and categorized in accordance with the respective agent's mobility relative to the automated vehicle;

selecting at least one of the multiple hypotheses as best predicted future paths for the one or more agents over the predetermined time period;

detecting a collision course between the automated vehicle and the one or more agents by the vehicle system based on the selected at least one of the multiple hypotheses;

calculating one or more decisions that avoid a collision in response to detecting the collision course, wherein each decision includes a trajectory for the automated vehicle based at least in part upon an assigned driving mode for the automated vehicle;

selecting a decision from the one or more decisions; and controlling operation of the automated vehicle based on the selected decision.

16. The computer readable storage medium of claim 15, wherein one or more Recurrent Neural Networks (RNN) are used to calculate the one or more decisions that avoid the collision.

17. The computer readable storage medium of claim 15, wherein the movement information from the one or more mobile and/or stationary objects includes speed, heading, and location information.

18. The computer readable storage medium of claim 15, wherein a collision window is utilized to detect a collision course.

19. The computer readable storage medium of claim 15, wherein controlling operation of the automated vehicle includes a change of speed and/or a lane change.

20. The computer readable storage medium of claim 15, wherein the driving modes for the training vehicle comprise aggressive modes, moderate modes, conservative modes, scenic modes, and enthusiastic modes.

* * * * *